United States Patent [19]
Roth, Jr.

[11] 3,961,818
[45] June 8, 1976

[54] AIR BUMPER
[76] Inventor: George Roth, Jr., 4529 N. Hamilton, Chicago, Ill. 60625
[22] Filed: Mar. 28, 1975
[21] Appl. No.: 563,126

[52] U.S. Cl. .............................................. 293/71 P
[51] Int. Cl.² ......................................... B60R 19/10
[58] Field of Search .................. 293/71 R, 71 P, 85, 293/86

[56] References Cited
UNITED STATES PATENTS
3,841,683  10/1974  Toro ................................. 293/71 P
3,848,736  11/1974  Eshelman ........................ 293/71 P

*Primary Examiner*—Allen N. Knowles
*Assistant Examiner*—Norman L. Stack, Jr.
*Attorney, Agent, or Firm*—Hill, Gross, Simpson, Van Santen, Steadman, Chiara & Simpson

[57] ABSTRACT

An improved air bumper having a tubeless or inner tube filled encasement surrounding an elongated rim. First and second mounting assemblies secure the bumper to a car frame. Each mounting assembly is comprised of upper and lower spaced supports which are slidable in an enclosure. A spring surrounding the supports provides shock absorption between the air bumper and car frame.

1 Claim, 5 Drawing Figures

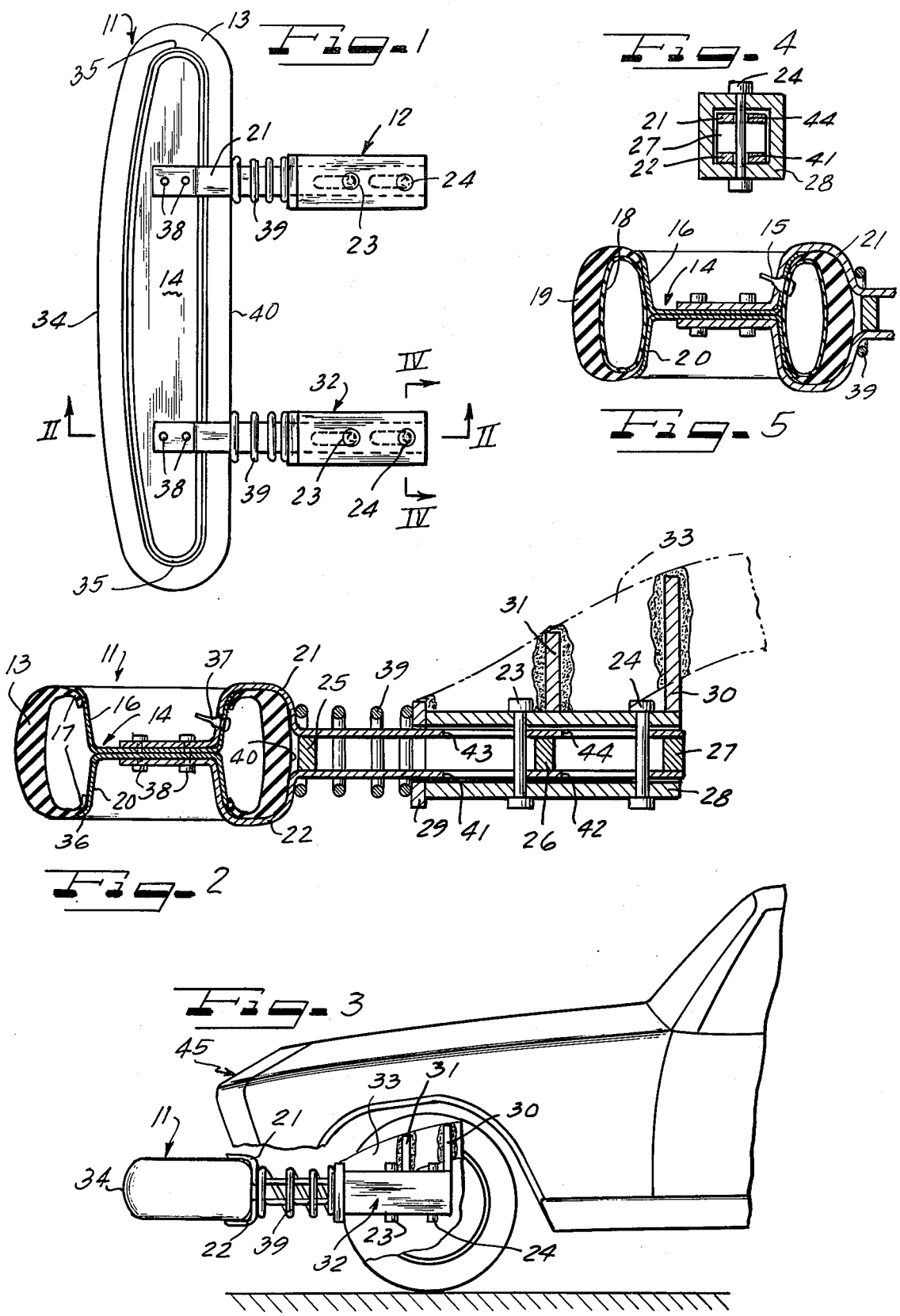

AIR BUMPER

BACKGROUND OF THE INVENTION

1. Field of the Invention

The present invention relates generally to an air bumper and mounting assembly, and particularly to an air bumper with an encasement surrounding a rim and a mounting assembly with springs for shock absorption.

2. Description of the Prior Art

It has been known heretofore to provide an inflated bumper for a vehicle with spring loaded mounting assemblies.

In U.S. Pat. No. 1,380,759 of Whitaker, a circular encasement with an air filled tube therein is mounted on the front of a carrier plate which is connected to a car frame by a spring loaded mounting assembly. U.S. Pat. No. 2,120,459 of Brown shows a similar assembly.

U.S. Pat. No. 2,890,904 of Materi illustrates a pneumatic bumper which is adapted to be either tubeless or for use with an inner tube. A rubberized casing is supported by rubber shock absorbing extensions which are mounted via posts to the car frame.

In the above patnets and all other known art, air filled encasements are supported from behind by posts and/or carrier plates.

Convenient mounting of these encasements is difficult since special mounting points must be provided on the encasements.

SUMMARY OF THE INVENTION

The invention described herein is an improvement over the prior art wherein mounting of a rubber encasement is more easily and securely attached to a mounting means and construction is simplified.

A rubber encasement adaptable for tubeless or tube filled construction is provided in a manner similar to known tubeless automobile tires except for an elongated construction. This encasement is mounted on an elongated two section rim in a manner similar to automobile tires. Upper and lower supports with a U-shaped portion therein attach the rim to the auto frame via spring-loaded slidable mounting assemblies. The U-shaped portion permits the mounting supports to pass around a rear portion of the rubber encasement.

It is an object of this invention to provide a means for mounting a rubber encasement for an air bumper which is simple and inexpensive, yet of very strong construction.

It is a further object of this invention to provide a rubber encasement of an elongated toroidal shape which mounts on an elongated rim in a manner similar to automobile tubeless tires.

It is another object of this invention to provide a springloaded mounting mechanism for the rim and attached air filled encasement.

It is a further object of this invention to use air rather than some other medium as a compression material within the rubber encasement.

BRIEF DESCRIPTION OF THE DRAWINGS

FIG. 1 is a top plan view of the bumper and mounting assembly;

FIG. 2 is a side view of a vertical cross section along line I—I of FIG. 1 of the bumper and mounting assembly attached to a car frame;

FIG. 3 is a side view illustrating the relationship between the bumper and a typical car body;

FIG. 4 is a rear cross-sectional view taken along line II—II in FIG. 1 of the mounting assembly enclosure detail; and FIG. 5 is a side cross-sectional view of an alternate embodiment of the bumper which has an inner tube within the encasement.

DESCRIPTION OF THE PREFERRED EMBODIMENTS

A bumper 11 shown generally in FIG. 1 is comprised of an encasement 13 mounted to a rim 14.

The encasement 13 is preferably constructed of rubber or a compound thereof. However, other materials, especially in an inner tube version of the bumper described below, may be used provided they have sufficient strength combined with flexibility. Rubber compounds used in the construction of tubeless automobile tires is particularly desirable in the tubeless version described herein.

Encasement 13 is in the shape of an elongated toroid with a front end 34 bowed out. The remaining design features are similar to a tubeless automobile tire. An interior portion of the encasement is defined by lips 17 which act as a sealing means in combination with a rim 14. Bends 35 are carefully rounded to permit sealing of the encasement to the rim. Corners with too small a radius create tubeless sealing difficulties.

Rim 14 functions as a mounting frame for encasement 13 and has a similar elongated shape to match the encasement. The rim construction is similar to an automobile tire rim in many respects. Upper and lower U-shaped sections 16 and 20 are welded or pressed together back to back. A rim lip 36 is formed on wall perimeters of the rim section to mate with lips 17 on the encasement and thus permit tubeless sealing as in a conventional automobile tire. An air nozzle 37 is mounted on the upper section 16 and serves as an entry port for air.

The rim 14 is preferably constructed of a light weight material such as aluminum in order to maintain overall bumper weight to a minimum. The encasement 13 and rim 14 are preferably filled with air. Liquids are not used because of weight limitations and compression considerations. Also, the use of flammable liquids such as oil could prove a hazard in a collision.

FIG. 5 illustrates an alternate embodiment of the invention in which an inner tube 18 is sandwiched between the rim 14 and encasement 13. If bends 35 are of a short radius, then inner tubes are advantageous to avoid self-sealing problems of the tubeless embodiment.

FIG. 2 illustrates the mounting detail. First and second mounting assemblies 12 and 32 connect the rim 14 to a car frame 33. Each assembly is identical to the other and only one will be described.

Upper and lower supports 21 and 22 are each formed with a U-shaped intermediate section which is fitted over a rear end 40 of the bumper 11. Two bolts 38 secure one end of the upper and lower supports to the rim 14 in sandwich fashion with the surface of the rim 14 between the ends. First, second and third spacers 25, 26 and 27 bind the upper and lower supports together at a preset distance. The first spacer 25 is positioned near the rear end 40 of the encasement 13. The second spacer 26 is placed at an intermediate position; and the third spacer 27 is positioned at the rear ends of the upper and lower supports.

A spring 39 encircles the upper and lower supports 21 and 22. It is positioned such that one end abuts rear end 40 of the encasement 13 and the other rests against a spring stop plate 29.

The upper and lower supports 21 and 22 are slidably mounted in an enclosure 28 best seen in FIGS. 2 and 4. The enclosure is a hollow rectangular body with an inside width dimension equal to or slightly greater than a width of the upper and lower supports. First and second lower slots 41 and 42 and first and second upper slots 43 and 44 are mounted on the lower and upper supports respectively. First and second bolts 23 and 24 pass through these slots to slidably secure the arm supports within the enclosure 28. The length of the slots is equal to or greater than the compression distance of the spring 39. In an equilibrium position of the bumper, rear ends of the slots abut the bolts. Upon collision, the slots slide past the bolts.

The enclosure 28 is mounted to the car frame 33 by first and second arms 30 and 31 and spring stop plate 39. Welds are used to attach these arm members between the car frame and the enclosure.

Other mounting means for the enclosure are obvious depending upon the shape and location of the car frame 33 in various vehicles.

FIG. 3 illustrates the relationship of the bumper 11 to a car front. The front end 34 is positioned sufficiently ahead of the car front 45 such that in a collision, the car front is not damaged when the spring compresses and the front end 34 of the encasement 13 flattens.

A bumper 11 with mounting assemblies 12 and 32 may similarly be mounted at a rear end of the car.

Although this invention is described in connection with use on a car, it is obviously applicable to any motor vehicle.

It will be apparent that many modifications and variations may be effected without departing from the scope of the novel concepts of this invention.

I claim as my invention:

1. A motor vehicle bumper adapted to protrude from portions of the vehicle body to be protected, comprising:
  a. a vehicle body;
  b. a rubber compound encasement shaped as an elongated loop formed of a substantially linear rear portion adjacent the vehicle body, a bowed front portion, and two curved end portions connecting said rear and front portions, said encasement having upper and lower lips around an inner periphery of the loop;
  c. an elongated rim supporting said encasement, said rim having upper and lower peripheral lips which seal with said upper and lower encasement lips around their entire periphery, said rim having an air valve connected thereto;
  d. upper and lower support means each having a U-shaped intermediate portion for fitting around said encasement rear portion, said upper and lower support means being spaced and slidably contained within a hollow enclosure attached to the vehicle body, a spring encircling said upper and lower supports and positioned between said encasement rear portion and said hollow enclosure.

* * * * *